March 31, 1931.  C. COOPER  1,798,307
TREATMENT OF GASES
Filed Oct. 23, 1929  2 Sheets-Sheet 2

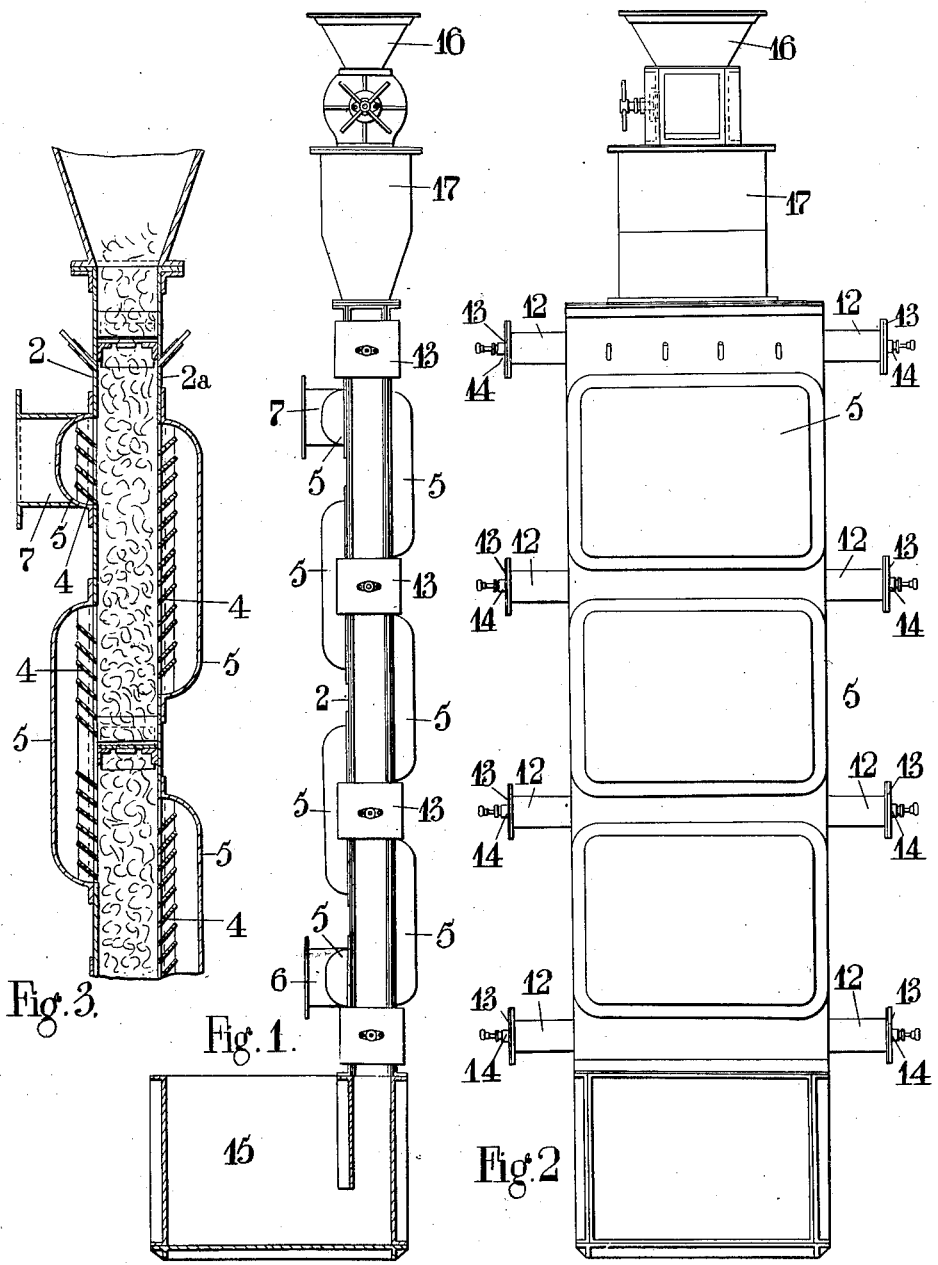

C. Cooper
INVENTOR

Patented Mar. 31, 1931

1,798,307

UNITED STATES PATENT OFFICE

CHARLES COOPER, OF HUDDERSFIELD, ENGLAND, ASSIGNOR TO W. C. HOLMES AND COMPANY, LIMITED, OF HUDDERSFIELD, ENGLAND

TREATMENT OF GASES

Application filed October 23, 1929, Serial No. 401,873, and in Great Britain November 21, 1928.

This invention relates to the treatment of gases by bringing the same into contact with solids which may be inert to the gas and function solely as means for securing an extended surface of the liquid between which and the gas contact is primarily desired or which may be material which is active with respect to the gas or certain of its constituents.

As is well known where gas is brought into contact with packing or other solid material in towers or the like, the resistance to the flow of the gas increases as the height of the tower is increased with a given density of filling, unless the cross sectional area of the tower is correspondingly increased.

In order to overcome the consequent difficulties, when subjecting gases to solid catalytic or other reactive agents, apparatus as claimed in the British specification No. 276,736 has been designed, the gas in this case passing in a zig-zag path through a body of solid material contained in a trunk or inner chamber having foraminous walls located in an outer chamber provided with suitable baffles and with an inlet and outlet for the gas.

One object of the present invention is to provide improved apparatus in which gases may be brought into contact with solids, which as above indicated may be inert or may be active with respect to the gas or certain of its impurities or other components.

Apparatus in accordance with the invention comprises essentially a tower adapted to contain the solid material, a main inlet and main outlet for the gas, and apertures in the walls of the tower connected together by free or unobstructed passages individually or in groups in such manner that the gas travelling through the tower may flow therethrough in a generally zig-zag path or in other words transversely through the material in the tower through a passage again transversely through the material and so on.

Thus, in accordance with the invention, the tower adapted to contain the solid material may be provided at intervals with gratings or the like in its walls with which are associated cover plates or headers adapted to permit gas passing outward through the gratings or the like to travel and again enter the tower passing through a portion of the same or a succeeding grating and thence through the solid material therein.

Optionally, in accordance with the invention, means may be provided within the tower adapted to restrict the flow of the gas in an axial direction with respect to the tower and thus promote the passage of the gas in a zig-zag path through the material therein.

In one construction, in accordance with the invention, the tower is provided on each of its two opposite walls with gratings and cover plates or headers located in such manner as to permit the gas passing through the tower to travel in a zig-zag path.

Generally the gratings on one side will be arranged out of register with the gratings on the other side of the tower, the lower extremity of the grating on one side extending below the upper level of the grating upon the other side and normally a space will be left between the upper extremity of each grating upon one side and the lower of the next succeeding grating.

Between adjacent ends of certain of the gratings means may be provided adapted to prevent or restrict the flow of the gas directly through the tower and such means may also constitute locks adapted to facilitate the discharge of the solid material from the tower.

For instance, movable or valved partitions may be provided in the tower at different levels in such manner that the partitions may be moved into and out of position to prevent or permit the discharge of the solid material from an upper to the next lower section and in this way the material contained in the lowermost section of the tower may be discharged by opening the lowest partition after having closed the partition next above it. The corresponding sequence of operations may then be continued with succeeding partitions until the charge of material originally in the sections of the tower between the several partitions has been allowed to fill the next lower section of the tower, taking the place of the material discharged therefrom.

Conveniently, in accordance with the invention, deflectors inclined toward the median plane of the tower and extending from the end walls thereof may be associated with each partition in order to direct the solid material discharged from the one section to another toward the centre of the tower.

With this construction means may be provided at the head of the tower for introducing further quantities of solid material thereinto and such means may comprise a valve or lock element adapted to permit the introduction of solid but preclude or limit the outflow of gas.

The invention will be described further in detail and by way of example with reference to the accompanying drawings illustrating a construction in which the solid material may be delivered at intervals from section to section of the tower in a stepwise manner and finally discharged as above described.

Figure 1 of the drawings is a side elevation, and

Figure 2 is a front elevation of the apparatus;

Figure 3 is a fragmentary section on an enlarged scale of the tower;

Figure 5 is a section on the line V—V of Figure 1, while

Figure 4:
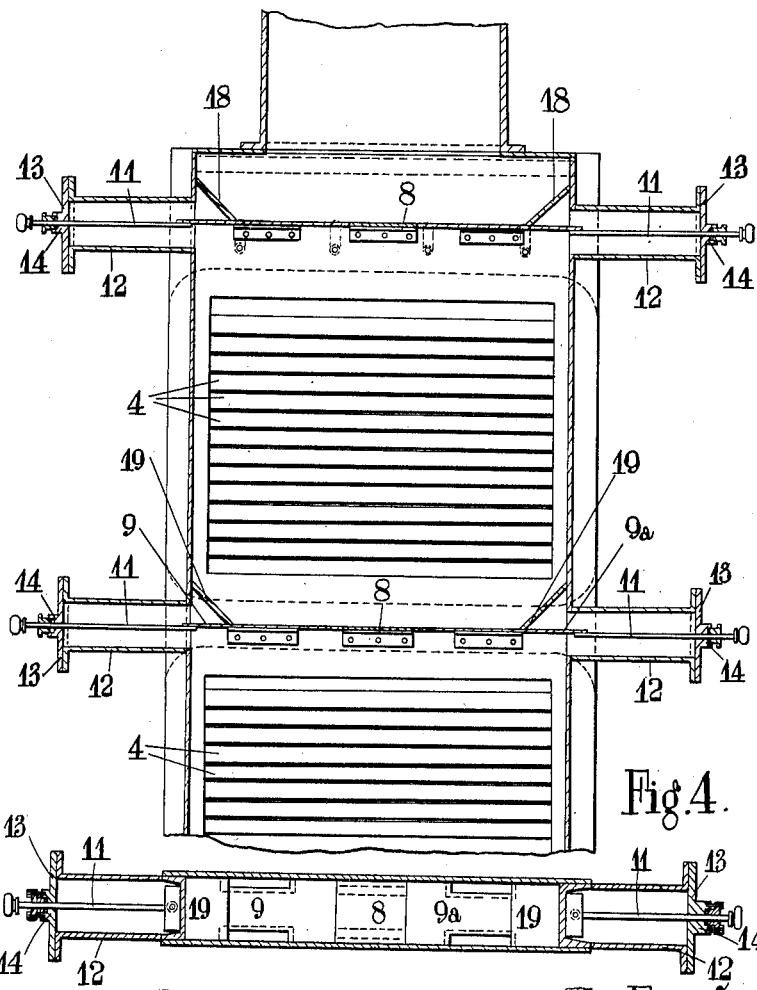
Figure 4 is a corresponding view on a plane at right angles to the plane of the section in Figure 3.
Figure 5:
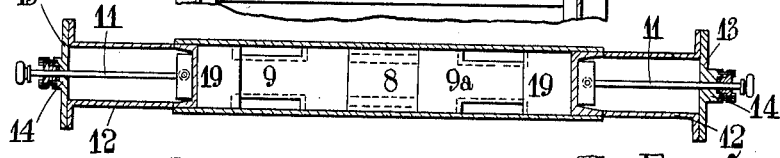
Figure 6:
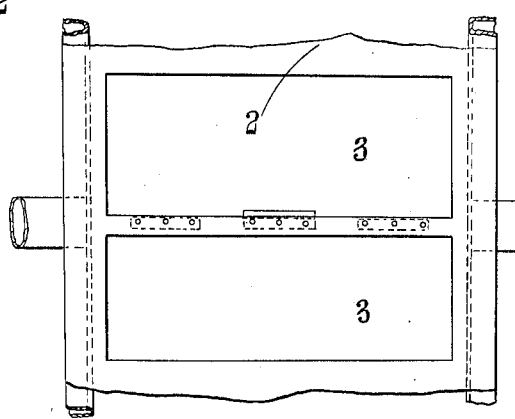
Figure 6 is an elevation of a portion of the side walls of the tower with the cover plate removed.

The main portion of the tower consists of two end walls and two side walls 2 and 2a, the width of which is considerably greater than the width of the end walls. At intervals openings 3 (see Figure 6) are provided in each of the side walls, these openings being spaced apart for a suitable distance adapted to facilitate the zig-zag flow of the gas and over these openings are arranged gratings 4 which are of louvred formation, the louvres being inclined from the general surface of the side walls of the tower in an upward direction. Cover plates 5, connected with or adapted to be connected with the gratings so that each cover plate and its associated grating may be simultaneously placed in position on the walls of the tower, are provided.

The lowermost of the openings on one side of the tower will normally be designed to function as an inlet for the gas and the cover plate associated with this opening will be suitably formed, being provided with a tubular extension 6 to which the gas main may be connected and similarly the upper opening may be provided with a cover plate furnished with an outlet 7 for the gas. The remaining openings are arranged in staggered relationship on the opposite sides of the tower the openings on the one side partly overlapping the corresponding openings on the other side.

In the tower and between certain of the cover plates are provided movable or valved partitions each comprising a fixed member 8 located adjacent to the median plane or a plane in which the centre line of the tower lies and which is transverse to the major axis of the cross section of the tower and movable elements 9 and 9a adapted from outside the tower to be brought against the fixed member to prevent the discharge of solid material from the section with which it is associated to a lower section of the tower and support or assist in supporting the solid material in the section or to be moved outward so as to permit such discharge of the solid material. These movable elements in the construction illustrated are arranged as slides bearing upon guide members 10, located within the tower connected with rods 11 extending in an outward direction from the tower by which they may be operated.

The end walls of the tower, in the construction illustrated, are provided with tubular extensions 12 to each of which is secured an end plate 13 in which a gland 14 engaging a rod for operating the slide is provided.

The tower terminates, as shown in Figures 1 and 2, at its base in a pit or tank 15 adapted to act as a seal and which may act, if the tower is employed for bringing gas into intimate contact with liquid or for separating tar or other liquid from the gas, as a receptacle for the liquid.

At the head of the tower, a valved hopper 16 is arranged, in the construction illustrated, which communicates with a chamber 17 into which fresh solid material may be introduced from the hopper and from which it will be charged into the body of the tower.

Below this hopper are arranged deflectors 18 and below each of the partitions similar deflectors 19 are provided. These deflectors are inclined towards the median plane and extending from the end walls thereof operate to direct the solid material discharged from one section to another towards the centre of the tower.

Apparatus in accordance with the invention may be employed as a scrubber for removing tar from fuel gases, in which case the solid material in the lower section of the tower may become relatively rapidly fouled with tar while the material in the upper portion remains relatively clean in which case the next but lowest partition member of the tower may be closed and the partition at the base of the lowermost section opened with the result that the material contained therein will be discharged. The lowermost partition may then be closed, the third partition from the bottom being also closed and the second partition member from the bottom being opened to allow the material located between it and the third partition member to descend after which the fourth partition member from the bottom may be closed and the third partition member opened, this sequence of operations being carried out until the uppermost section of the chamber is emptied of solid material, further quantities of the same being then introduced.

The apparatus in accordance with the invention may be operated in a similar manner when the tower is employed, for instance, as a purifier for fuel gases when bringing the gas into contact with a solid active agent, the spent or used solid material being discharged in a stepwise manner.

Where the apparatus in accordance with the invention is employed for bringing gases into contact with liquids the tower will be filled with solid bodies such as "Raschig" rings or the like adapted to promote contact between the gas and the liquid and the discharge of these rings from the tower will, in such cases, generally be relatively infrequently effected as, for instance, where the rings or like packing material have become broken or otherwise injured or fouled by long use.

As applied to the treatment of gases with liquid the invention extends to the method which comprises causing gases to travel through the tower in contact with liquid distributed over packing or filling material in conditions in which the main or general path or direction of the flow of the gas is transverse to the flow of the liquid or in which the cross section of the path of the gas is independent of the cross section of the path of the flow of the liquid.

This method of bringing gases into contact with the liquid is novel and while conveniently effected by the employment of apparatus of the character described above the invention is not limited insofar as the method above defined is concerned to the employment of apparatus as described herein.

It will be understood that the construction of tower above described provides an increased degree of freedom in design to secure a low resistance to the flow of the gas, satisfactory distribution of the liquid and the desired degree of intimacy of contact between the gas and the liquid.

Imperfections of contact, due to what may be described as channelling, that is to say the passage of the gas in a stream directly through a relatively open portion of the filling material with the result that intimate contact of the gas so flowing and the liquid is not secured, are less liable to occur in apparatus in accordance with the invention than in existing apparatus and, moreover, if in passing through one section of the tower a portion of the gas is not brought into intimate contact with the liquid, during its subsequent passage through a header to a succeeding section, the imperfectly treated gas will become mixed with that which has been caused to come into intimate contact with the liquid.

With existing constructions as above indicated, the dimensions of the tower are controlled by considerations of the resistance to the passage of the gas through the packing material with the result that when finely graded packing or filling material is used, in order to keep down the resistance to the flow of gas, a wide or squat form of apparatus has hitherto of necessity been employed.

With a wide and squat form of tower the difficulties of distributing the liquid over the filling material are increased and, further, there is an increased risk of a considerable proportion of the gas passing through the tower without being brought sufficiently into intimate contact with the packing or the liquid distributed thereover.

While in the above description reference has been made to specific forms of constructional details and arrangements various changes may be made in such details and arrangements and otherwise without exceeding the scope of the present application.

Having now described my invention, what I claim as new and desire to secure by Letters Patent is:—

1. Apparatus in which gases may be brought into contact with solids comprising a tower adapted to contain solid material, a main inlet for introducing gas thereto, a main outlet for the exit of gas therefrom, apertures in the walls of said tower, means interconnecting said apertures in a manner adapted to permit unobstructed passage of gas therein whereby gas travelling through the tower may flow transversely through solid materials, through said interconnecting means and again transversely through solid material, and valved partitions in the tower at different levels dividing the same into a plurality of sections adapted to be moved into and out of position in order to regulate the passage of solid material from an upper to the next lower section.

2. Apparatus in which gases may be brought into contact with solids comprising a tower adapted to contain solid material, a main inlet for introducing gas thereto, a main outlet for exit of gas therefrom, gratings at intervals in the walls of said tower, headers associated with said gratings adapted to permit the gas passing outward from the gratings to travel therethrough and again enter the tower passing through a portion of the solid material therein, valved partitions dividing the said tower into a plurality of sections adapted to be moved into and out of position in order to regulate the passage of solid material from an upper to a next lower section, and deflectors associated with said valved partitions inclined toward the median plane of the tower and extending from the end walls thereof adapted to direct the solid material discharged from one section to another section toward the centre of the tower.

3. Apparatus in which gases may be brought into contact with solids comprising a tower adapted to contain solid material, a main inlet for introducing gas thereto, a main outlet for the exit of gas therefrom, apertures in the walls of said tower, means interconnecting said apertures in a manner adapted to permit unobstructed passage of gas therein whereby gas travelling through the tower may flow transversely through solid material, through said interconnecting means and again transversely through solid material, valved partitions dividing the tower into a plurality of sections and adapted to be moved into and out of position in order to regulate the passage of solid material from an upper to a next lower section, and deflectors associated with said valved partitions inclined toward the median plane of the tower and extending from the end walls thereof adapted to direct the solid material discharged from one section to another section toward the centre of the tower.

4. Apparatus in which gases may be brought into contact with solids comprising a tower adapted to contain solid material, a main inlet for introducing gas thereto, a main outlet for the exit of gas therefrom, apertures in the walls of said tower, means interconnecting said apertures in a manner adapted to permit unobstructed passage of gas therein whereby gas travelling through the tower may flow transversely through solid material, through said interconnecting means and again transversely through solid material, valved partitions in the tower at different levels dividing the same into a plurality of sections and adapted to be moved into and out of position in order to regulate the passage of solid material from an upper to a next lower section, and deflectors associated with said valved partitions inclined toward the median plane of the tower and extending from the end walls thereof adapted to direct the solid material discharged from one section to another section toward the centre of the tower.

5. Apparatus in which gases may be brought into contact with solids comprising a tower adapted to contain solid material, a main inlet for introducing gas thereto, a main outlet for the exit of gas therefrom, gratings at intervals in the walls of said tower, headers associated with said gratings adapted to permit the gas passing outward from the gratings to travel therethrough and again enter the tower passing through a portion of the solid material therein, valved partitions dividing the said tower into a plurality of sections and adapted to be moved into and out of position in order to regulate the passage of solid material from an upper to a next lower section, and deflectors associated with said valved partitions inclined toward the median plane of the tower and extending from the end walls thereof adapted to direct the solid material discharged from one section to another section toward the centre of the tower.

In testimony whereof I have signed my name to this specification.

CHARLES COOPER.